United States Patent [19]

Staley, Jr.

[11] Patent Number: 5,156,190

[45] Date of Patent: Oct. 20, 1992

[54] HYDRAULIC SAFETY HOSE WITH FLUID REMOVAL CONDUIT

[75] Inventor: Colin R. Staley, Jr., Burlington, N.C.

[73] Assignee: Colin R. Staley, III, Burlington, N.C.

[21] Appl. No.: 804,626

[22] Filed: Dec. 6, 1991

Related U.S. Application Data

[63] Continuation of Ser. No. 574,590, Aug. 29, 1990, abandoned.

[51] Int. Cl.⁵ .................. F16L 55/00; F16L 9/14
[52] U.S. Cl. ...................... 138/104; 138/103; 137/312
[58] Field of Search ............ 138/103, 104, 178; 137/312; 285/13

[56] References Cited

U.S. PATENT DOCUMENTS

| 239,284 | 3/1881 | Weisbarth | 137/312 |
|---|---|---|---|
| 2,608,205 | 8/1952 | Proctor | 137/312 |
| 2,954,797 | 10/1960 | Dryer | 137/312 |
| 3,472,062 | 10/1969 | Owen | 138/104 |
| 3,581,775 | 6/1971 | Dahl | 138/104 |
| 3,712,330 | 1/1973 | Davis | 137/312 |
| 3,721,270 | 3/1973 | Wittgenstein | 138/104 |
| 3,756,294 | 9/1973 | Rainey | 137/312 |
| 3,802,456 | 4/1974 | Wittgenstein | 138/104 |
| 3,830,290 | 8/1974 | Thamasett et al. | 138/104 |
| 3,907,336 | 9/1975 | Siegmund | 285/93 |
| 4,349,049 | 9/1982 | Silvey | 138/103 |
| 4,644,780 | 2/1987 | Jeter | 73/40 |
| 4,667,505 | 5/1987 | Sharp | 138/104 |
| 4,700,751 | 10/1987 | Fedrick | 138/104 |
| 4,775,855 | 10/1988 | Cox | 138/104 |
| 4,836,237 | 6/1989 | McCullough | 137/312 |
| 4,848,408 | 7/1989 | Fortmann et al. | 138/104 |
| 4,930,549 | 6/1990 | Renner | 137/312 |

FOREIGN PATENT DOCUMENTS

| 2582383 | 11/1986 | France | 138/104 |
|---|---|---|---|
| 910827 | 11/1962 | United Kingdom | 137/312 |
| 2023296 | 12/1979 | United Kingdom | 138/104 |

Primary Examiner—James E. Bryant, III
Attorney, Agent, or Firm—Richard E. Jenkins

[57] ABSTRACT

A hydraulic safety hose with fluid removal conduit is disclosed which protects the operator from injury due to hose rupture as well as preventing environmental damage by containing the flow of escaping hydraulic fluid. The hydraulic hose comprises inner and outer pressure hoses with an annular passageway defined therebetween to receive hydraulic fluid in the event of rupture of the inner hose. A conduit including a shut-off valve fluidly communicates with the annular fluid passageway and extends outwardly and away from the inner and outer hoses so as to drain fluid from the annular passageway to a suitable remote reservoir in the event of rupture of the inner hose. The valve may be closed, as desired, to prevent fluid flow through the conduit and allow for continued emergency use of the safety hose.

2 Claims, 2 Drawing Sheets

HYDRAULIC SAFETY HOSE WITH FLUID REMOVAL CONDUIT

This is a continuation of co-pending application Ser. No. 574,590 filed on Aug. 29, 1990, now abandoned.

DESCRIPTION

1. Technical Field

The present invention relates to an improved hydraulic safety hose for use in hydraulic systems such as utilized by fork lift trucks, hydraulic presses, speedboats, automobile transmissions and the like.

2. Related Art

A long-standing problem associated with high pressure hydraulic hoses is the dangers associated with unexpected rupture thereof. Conventional high pressure hydraulic hoses do not provide any protection to persons in proximity thereto, and rupture of the hose can result in oil burns, fire burns and related injuries associated with the sudden release of hot fluid from a hydraulic hose utilized in a traditional application such as a fork lift truck. Moreover, if the rupture occurs in a hydraulic hose utilized in a speedboat or other water craft, the rupture can result in a major water pollution event in which a significant volume of oil is introduced into the water environment surrounding the boat. This type of pollution problem not only negatively affects the environment but also results in the waste of hydraulic fluid in a world in which energy conservation is becoming ever more important.

Others have tried to at least partially address these problems in the past by attempting to develop an improved and safer high pressure hydraulic hose. For example, U.S. Pat. No. 4,349,049 to Silvey discloses a hydraulic safety hose constructed of inner and outer hoses which are connected together at opposing ends with suitable ring clamps. The hoses define a circumferential passage therebetween to receive pressurized hydraulic fluid upon rupture of the inner hose, and a series of bleed holes or orifices are provided adjacent to each end of the outer hose in order to allow the hydraulic fluid to escape under low pressure when such a rupture occurs. The safety hose disclosed by Silvey serves to protect persons in proximity to the hydraulic system being used but does not solve the environmental pollution problem caused by release of the hydraulic fluid, nor does the hose provide the capability for continued emergency use for a short period of time.

Applicant has developed an improved safety hose which not only protects nearby persons from the sudden release of hot hydraulic fluid upon hose rupture but which also solves the problem of potential environmental pollution by escaping hydraulic fluid. Applicant's safety hose also provides the capability of limited emergency usage of the hydraulic hose.

DISCLOSURE OF THE INVENTION

In accordance with the present invention, applicant provides an improved hydraulic safety hose which not only protects nearby persons from injury from hot hydraulic fluid but which also serves to protect the environment and provide the capability of limited emergency usage of the safety hose for a period of time subsequent to rupture thereof. The hydraulic safety hose comprises a first fluid pressure hose for transmitting fluids under high pressure and a second fluid pressure hose surrounding and substantially coextensive in length with the first hose wherein the first and second hoses define an annular fluid passageway therebetween. A conduit is provided which extends outwardly from the first and second hoses and fluidly communicates with the annular fluid passageway to drain hydraulic fluid from the annular passageway to a remote location in the event of rupture of the first fluid pressure hose. The conduit includes valve means for closing the conduit to fluid flow.

It is therefore the object of the present invention to provide an improved safety hose which prevents nearby persons from being injured by high pressure hydraulic fluid escaping from a ruptured hydraulic line.

It is another object of the present invention to provide a hydraulic safety hose which protects the environment from pollution resulting from hydraulic fluid escaping from a ruptured high pressure hydraulic hose.

It is yet another object of the present invention to provide a hydraulic safety hose which is constructed to allow for continued emergency use thereof subsequent to rupture so that a machine operator may complete a task and/or return the machine with the ruptured hydraulic line to a desired site for repair.

BRIEF DESCRIPTION OF THE DRAWINGS

Some of the objects of the invention having been stated, other objects will become evident as the description proceeds, when taken in connection with the accompanying drawings, in which.

BEST MODE FOR CARRYING OUT THE INVENTION

Figure 1:
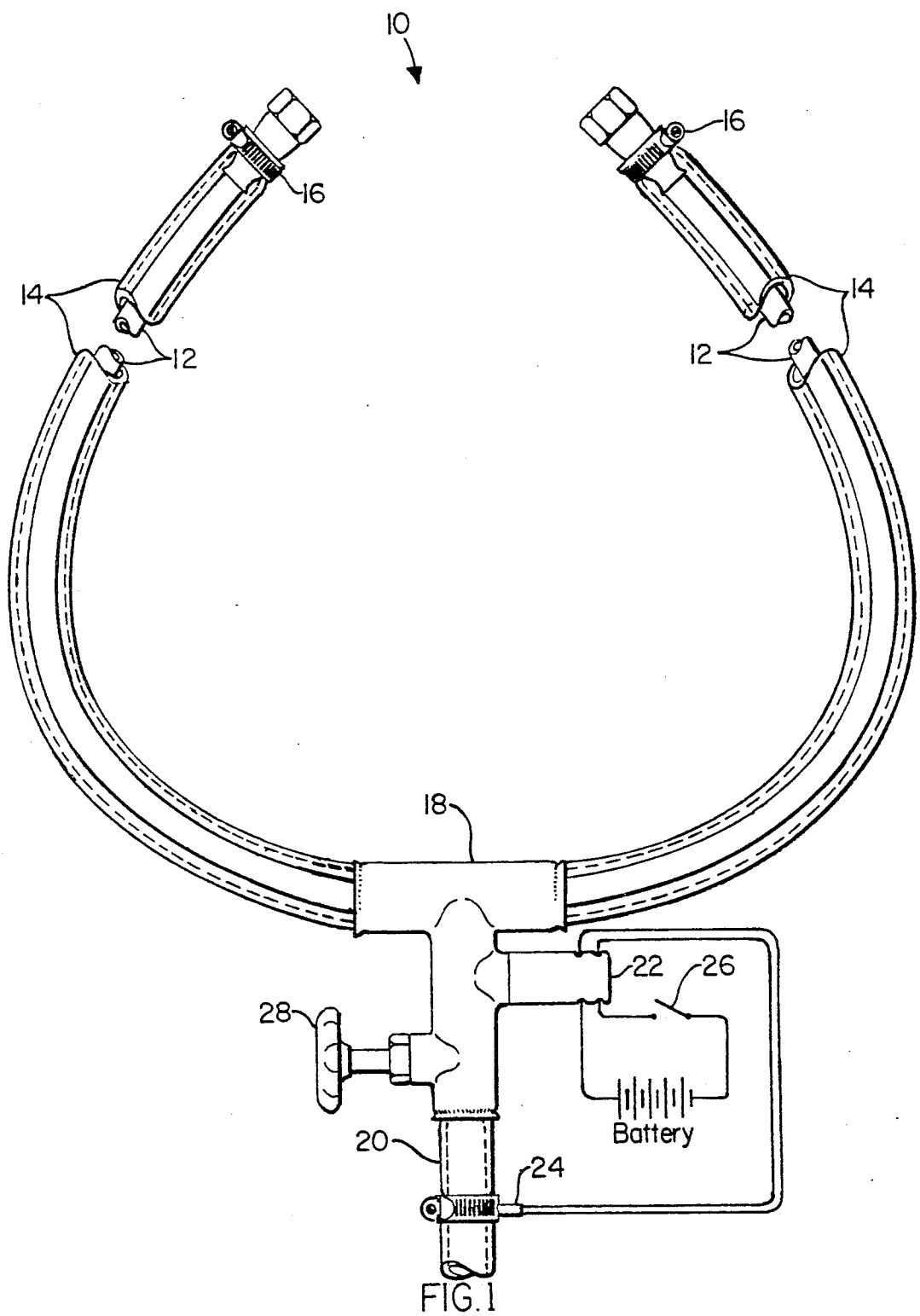
FIG. 1 is a schematic elevational view of an embodiment of a hydraulic safety hose made in accordance with the present invention.

Referring now more specifically to the drawings, a preferred embodiment of a hydraulic safety hose according to the present invention is shown in FIG. 1 and generally designated 10. Safety hose 10 includes an inner flexible primary hydraulic pressure hose 12 and an outer flexible secondary hydraulic pressure hose 14 which is substantially coextensive in length with inner hose 12. The inside diameter of outer hose 14 is slightly greater than the outside diameter of inner hose 12, and the difference defines a passageway P therebetween which extends along the entire length of coextensive hoses 12 and 14. Inner hose 12 and outer hose 14 may be constructed of any suitable conventional high pressure hydraulic hose material as would be well known to those skilled in the art.

Referring now to both FIGS. 1 and 2, further construction details of improved safety hose 10 will be described. Although applicant contemplates that the opposing terminal ends of inner hose 12 and outer hose 14 could be integrally formed into a unitary construction (not shown), conventional hose clamps 16 are shown in FIG. 1 for fluidly sealing the opposing ends of inner hose 12 and outer hose 14 so as to provide a sealed annular fluid passageway extending between the pair of hose clamps 16. A Tee or collar 18 is provided at a selected location along the length of inner and outer hoses 12 and 14, respectively, and secured thereto. Although Tee or collar 18 is shown medially positioned along the length of hoses 12 and 14, applicant contemplates that it could also be located elsewhere including adjacent to either opposing end of coextensive hoses 12 and 14. Preferably, inner hose 12 extends through Tee 18 and outer hose 14 is severed and spaced-apart therein so that ends 14' allow for fluid communication between collar 18 and annular passageway P (see FIG. 2). A flexible length of hose or other suitable tubing or conduit 20 is connected to and extends outwardly from collar 18. Flexible tubing or conduit 20 may be formed of any suitable material and is not required to possess high pressure performance capabilities (such as inner hose 12 and outer hose 14) since it will serve merely as a drain or conduit to a remote reservoir or holding tank for hydraulic fluid which escapes from ruptured inner hose 12 and flows through passageway P thereto.

Most suitably, Tee or collar 18 includes an electric solenoid valve 22 in electrical connection with an electric fluid sensor 24 positioned in drain conduit 20. On/off switch 26 serves to electrically connect fluid sensor 24, a battery or other suitable power source, and normally open solenoid valve 22. In operation, if a rupture occurs in inner hose 12, hydraulic fluid traversing annular passageway P to conduit 20 will be detected by fluid sensor 24 which will then serve to actuate solenoid valve 22 and close the fluid passageway through collar 18 to conduit 20. Optionally, applicant also contemplates providing a manual shut-off valve 28 in collar 18 which could be used if electric solenoid valve 22 failed to operate properly.

Figure 2:
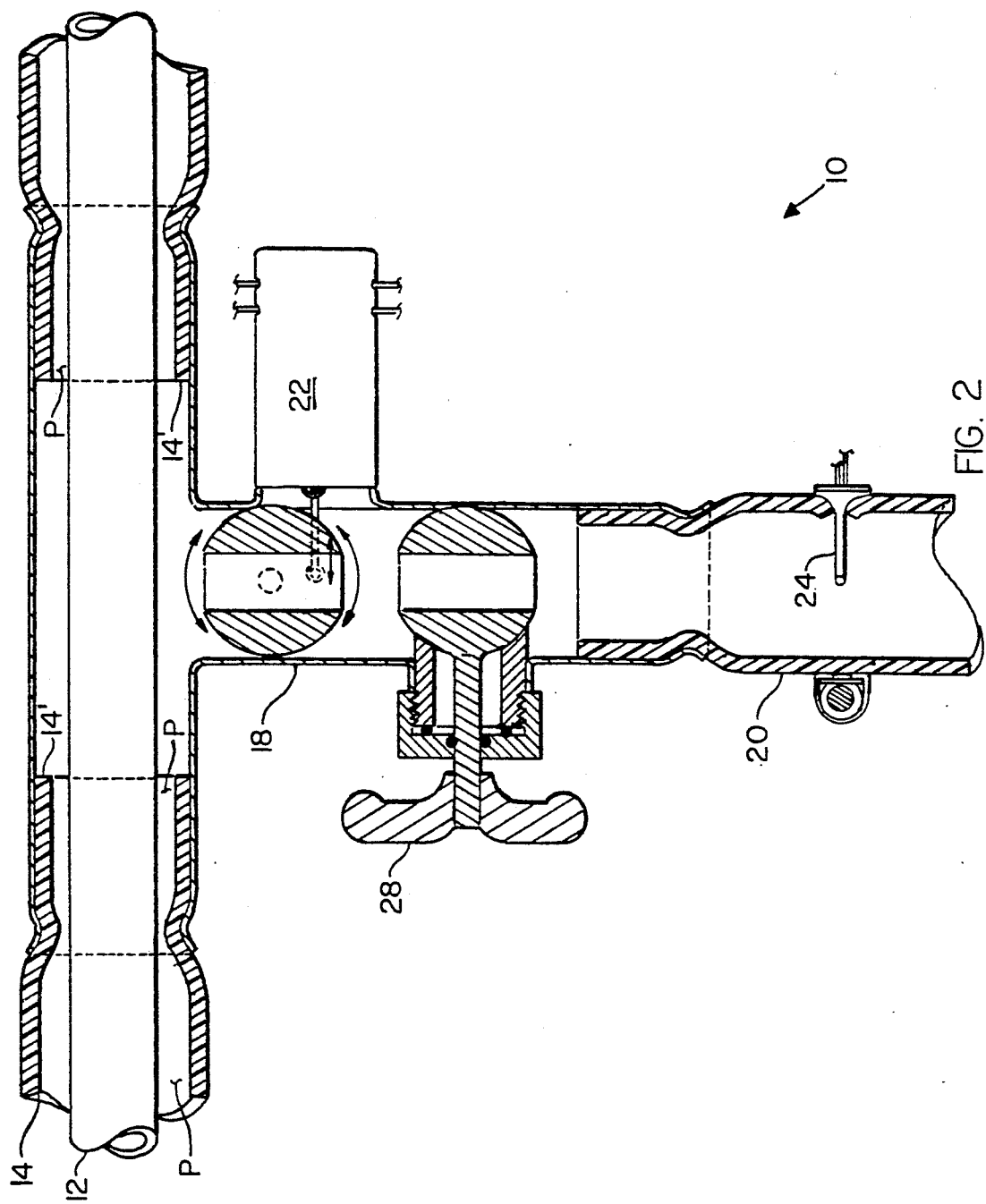
FIG. 2 is a fragmentary vertical cross-sectional view of the juncture of the conduit and pressure hoses of the embodiment of the hydraulic safety hose shown in FIG. 1.

Although FIGS. 1 and 2 illustrate a preferred embodiment of the safety hose of the present invention, applicant contemplates that various details of the invention may be changed without departing from the scope of the invention which is defined by the claims appended hereto. For example, safety hose 10 could be constructed so that drain collar 18 and conduit 20 extending therefrom include only manual valve 28 which may be opened or closed in accordance with the needs of an operator in the event of a rupture of inner hose 12. Also, safety hose 10 could utilize only electric fluid sensor 24 and solenoid valve 22 to detect hydraulic fluid flow and seal the passageway in collar 18 without the benefit of optional manual back-up valve 28. Regardless of the specific hose embodiment utilizing solenoid valve 22 and fluid sensor 24, switch 26 may be left open by an operator so that hydraulic fluid passing from annular passageway P through collar 18 and conduit 20 will be allowed to continue to flow therethrough to a remote reservoir or holding tank in accordance with the needs of the operator.

In use, applicant contemplates that the novel hydraulic safety hose described herein will provide both safety and performance flexibility to the operator of machinery incorporating hose 10 therein. For example, if hose 10 were utilized in a speedboat and a rupture in inner sleeve 12 occurred, hot pressurized hydraulic fluid would escape through annular passageway P and collar 18 into conduit 20 where it would be detected by fluid sensor 24. Assuming switch 26 is "on", solenoid valve 22 would be actuated and would close the fluid passageway through collar 18 to conduit 20 and thereby confine the fluid from ruptured inner hose 12 to annular passageway P. By sealing the passageway through collar 18 by either solenoid valve 22 or, optionally, by manual valve 28, it would be possible to continue to use hydraulic hose 10 on an emergency basis and return the speedboat to shore for repair. Moreover, hose 10 has prevented the environmentally undesirable event of hydraulic fluid being discharged into the water surrounding the boat and creating an environmental mess well known to frequent users of high powered speedboats. Also, another use of hose 10 would be for switch 26 to be turned "off" so that any rupture of inner hose 12 would result in all leaking hydraulic fluid being shunted to a remote reservoir or holding tank by conduit 20 so as to protect the environment from discharge of the fluid into the water. In this mode of operation, hose 10 could not be used on a continuing emergency basis as in the previously described mode of use.

It will be understood that various details of the invention may be changed without departing from the scope of the invention. Furthermore, the foregoing description is for the purpose of illustration only, and not for the purpose of limitation—the invention being defined by the claims.

What is claimed is:

1. A hydraulic safety hose comprising:
   a first flexible high pressure hose for transmitting hydraulic liquid under high pressure;
   a second flexible high pressure hose surrounding and substantially coextensive in length with said first hose, said first and second hoses defining an annular hydraulic liquid passageway therebetween and being sealed together at opposing ends thereof so as to fluidly terminate said annular passageway extending therebetween;
   a hydraulic fluid coupling secured to each of said opposing ends of said first hose; and
   conduit means extending outwardly from said first and second hoses and fluidly communicating with said annular passageway for draining hydraulic liquid from said annular passageway to a remote location in the event of rupture of said first hydraulic liquid pressure hose, said conduit means including a fluid detector and an electrically connected solenoid valve for detecting hydraulic liquid flow through said conduit means and actuating said valve upon detection thereof to prevent hydraulic liquid flow from said annular passageway, and said conduit means further including a manually actuated valve for closing said conduit means to fluid flow downstream from said solenoid valve.

2. A hydraulic hose according to claim 1 wherein said conduit means comprises a collar affixed to said first and second pressure hoses and fluidly communicating with said annular fluid passageway therebetween, and a flexible elongate conduit secured to said collar and extending outwardly therefrom.

* * * * *